March 31, 1964

L. K. V. SUDROW 3,127,131

DIRECTIONAL CONTROL MEANS FOR
ROTOR SUSTAINED AIRCRAFT

Filed Aug. 25, 1961

INVENTOR.
LYLE K. V. SUDROW
BY Knox & Knox

March 31, 1964

L. K. V. SUDROW 3,127,131

DIRECTIONAL CONTROL MEANS FOR
ROTOR SUSTAINED AIRCRAFT

Filed Aug. 25, 1961

INVENTOR.
LYLE K. V. SUDROW
BY
Knox & Knox

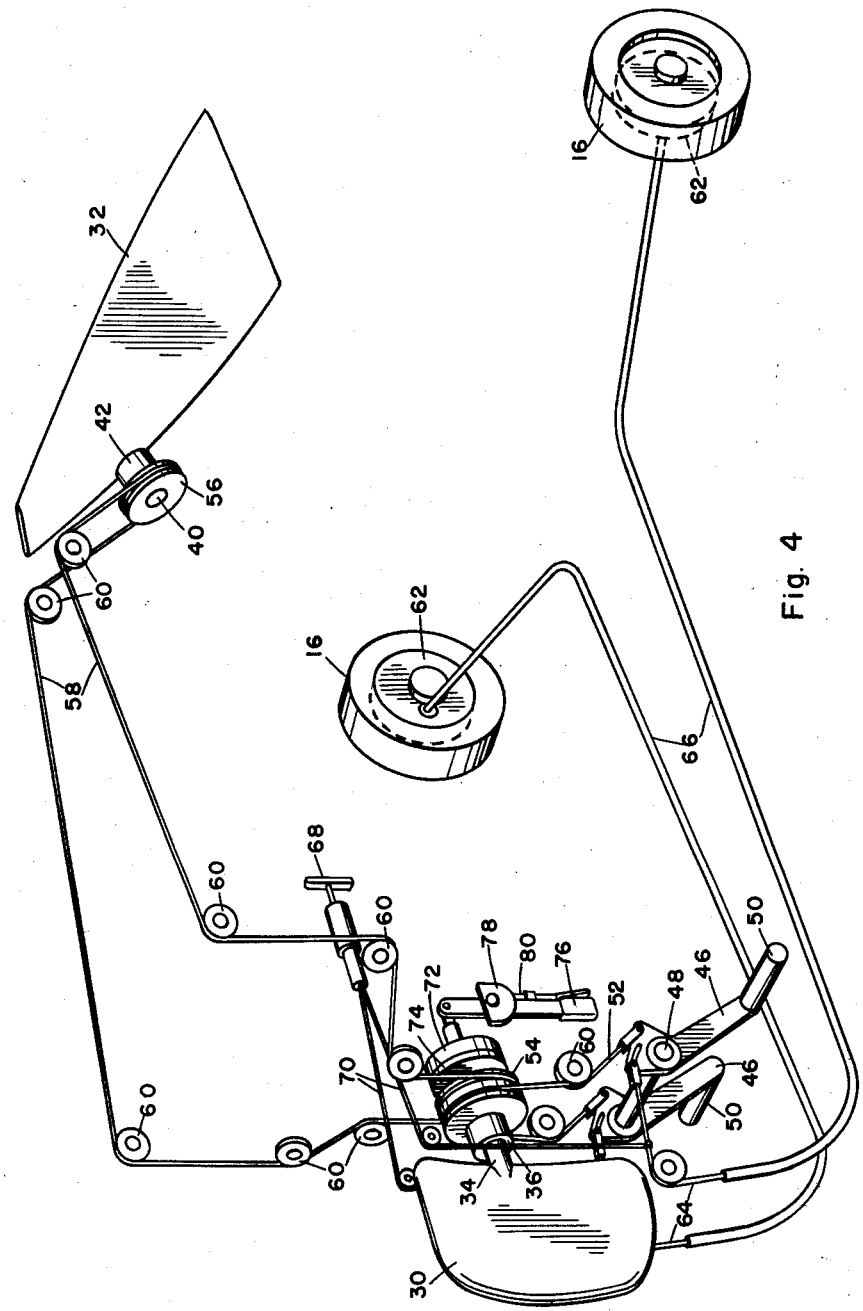

United States Patent Office 3,127,131
Patented Mar. 31, 1964

3,127,131
DIRECTIONAL CONTROL MEANS FOR ROTOR
SUSTAINED AIRCRAFT
Lyle K. V. Sudrow, Los Angeles, Calif., assignor to
Helipod, Inc., Oceanside, Calif.
Filed Aug. 25, 1961, Ser. No. 136,137
2 Claims. (Cl. 244—50)

The present invention relates generally to aircraft and more particularly to directional control means for rotor sustained aircraft.

The primary object of this invention is to provide directional control means for a rotor sustained aircraft utilizing the vertically downward slipstream from the sustaining rotor to deflect movable control surfaces, the system being effective in hovering, ascent or descent and in lateral flight in any direction.

Another object of this invention is to provide a directional control system which includes connections to brakes on the aircraft wheels and facilitates control of the aircraft in taxying on the ground.

Another object of this invention is to provide a control system which may be set to provide a trim to counteract crosswind or similar conditions which interfere with straight flight, the trim setting being easily overridden when other control is necessary.

A further object of this invention is to provide a directional control system operated by conventional means and which is instinctive in operation as in conventional aircraft.

Finally, it is an object to provide a directional control system of the aforementioned character which is simple and convenient to construct and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 4 is a diagrammatic view of the control system itself.

Similar characters of reference indicate similar or identical elements and portions throughout the specification and throughout the views of the drawings.

General Arrangement of Aircraft

Figure 1:
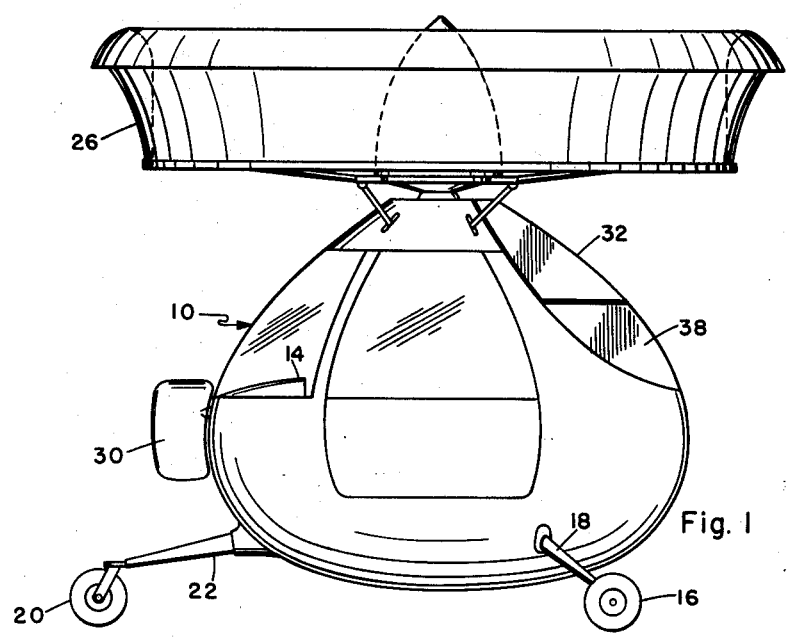
FIGURE 1 is a side elevation view of the aircraft incorporating the system.

The control system is adaptable to various types of aircraft sustained by a lifting rotor, which might be in the broad general category of helicopters. However, the system is particularly suitable for the ducted rotor sustained aircraft illustrated in FIGURES 1-3 and which is shown and described in my copending application Ser. No. 124,566 filed July 17, 1961, entitled "Aircraft." Generally, the aircraft comprises a pendulant streamlined fuselage or cabin 10 containing a passenger compartment which is fitted with a suitable seat 12 and instrument panel 14. The cabin is supported on a pair of main wheels 16 at the ends of legs 18 extending outwardly and rearwardly from the lower portion of the cabin, and a nosewheel 20 mounted on a forwardly extending leg 22. On top of the cabin 10 is mounted a sustaining rotor 24 enclosed in a circular duct 26. The aircraft is controlled by tilting the rotor and duct assembly and by engine speed control, the operation being described in detail in the above mentioned copending application and being omitted from the drawings for simplicity. The specific configuration and detailed structural design of the aircraft are not critical and are described only in sufficient detail to support the control system described hereinafter.

Directional Control System

Directional control is obtained from the combination of a forward rudder 30 and a rear rudder 32. The front rudder 30 is pivotally mounted on a horizontal shaft 34 extending forwardly from substantially the center of the nose portion of cabin 10, said shaft being supported in a bearing 36. The rear rudder 32 comprises the movable upper portion of a fin 38 on the upper rear part of the cabin 10, said rear rudder being pivotally mounted on a shaft 40 extending through a bearing 42. The axes of both rudders are substantially radial to the rotor axis, the front rudder axis being horizontal. The rear rudder axis, as illustrated, is inclined to the horizontal but, with a different cabin configuration, could be horizontal or nearly so. Both the front and rear rudders are exposed to the slipstream from rotor 24 flowing downwardly around the cabin 10 and are both pivoted with the greater portions of their areas below the pivotal axes, to ensure streamline stability.

Figure 3:
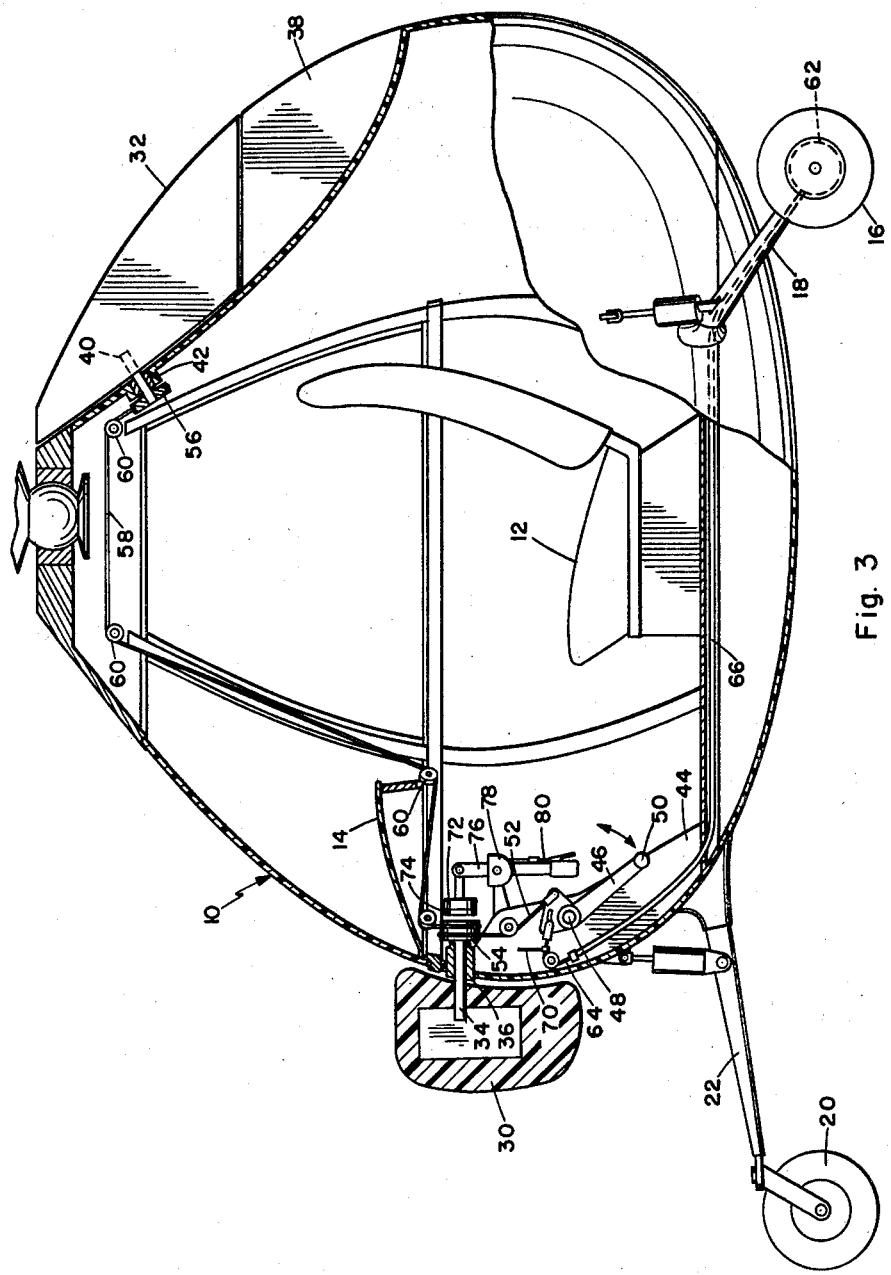
FIGURE 3 is an enlarged side elevation view with portions cut away.

In the forward lower portion of cabin 10 is a rigid nose frame 44 on which the control mechanism is mounted, the mechanism being clearly illustrated in FIGURES 3 and 4. The rudders are controlled by rudder pedals 46 independently pivotal on a cross shaft 48 and having foot bars 50. Connected to the rudder pedals 46 are cables 52 which extend upwardly and are secured around a pulley 54 fixed to the front rudder shaft 34, so that fore and aft swing of the rudder pedals provides rolling motion of the pulley and deflects the front rudder 30.

Figure 2:
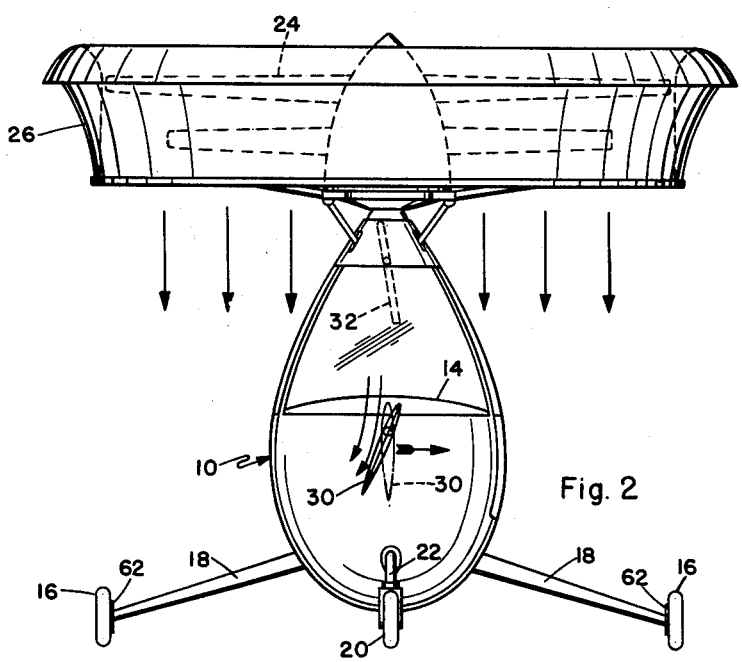
FIGURE 2 is a front elevation view thereof.

The rear rudder shaft 40 is fitted with a further pulley 56 from which cables 58 extend to and are secured around the pulley 54. Thus the front and rear rudders operate in unison but are coupled to swing in opposite directions as indicated in FIGURE 2. The cables 52 and 58 are routed in any convenient manner through the cabin structure and idler pulleys 60 are installed wherever necessary for change of direction.

The wheels 16 are each provided with a brake drum 62 of conventional type, the brakes being actuated by cables 64 which are coupled to the rudder pedals 46. The cable connections are made so that when the left rudder pedal is pushed forwardly, the left wheel brake is applied, the action being duplicated with the right wheel brake. The cables 64 can be led around pulleys or enclosed in conventional guide sleeves 66 as illustrated. When the aircraft is stationary on the ground, the brakes can be locked by means of a parking brake handle 68, conveniently mounted near the instrument panel, the handle being coupled to both cables 64 by auxiliary cables 70, as in FIGURE 4.

To simplify flying a predetermined course, means is provided to trim the rudder deflection to compensate for a cross wind condition. Adjacent the rear face of pulley 54 is a pressure plate 72 carrying a friction pad 74, said pressure plate being attached to a pivotally mounted trim setting handle 76, by which the friction pad can be brought to bear against said pulley. A quadrant 78 and conventional, hand brake type ratchet locking mechanism 80 are provided, so that varying degrees of pressure can be applied.

Control Operation

The controls are instinctive in operation as in conventional aircraft. When the left rudder pedal 46 is pushed forwardly, the forward rudder 30 has its lower portion deflected to the right and the rear rudder 32 has its lower portion deflected to the left, with respect to the pilot's position. The offset rudder positions are illustrated in FIGURE 2 and the downward slipstream from the rotor, indicated by directional arrows, strikes the offset rudders, causing rotation of the aircraft to the left, or counterclockwise, substantially about the rotor axis. Forward motion of the right rudder pedal produces a corresponding rotation of the aircraft to the right. On the ground, the rudder actions are coupled to the wheel brakes and provide positive control for taxying and parking.

In cruising flight, a cross wind condition may require constant rudder offset to keep the aircraft on course. To avoid the strain of holding the offset continuously, the rudders may be held in a suitable trim position by means of the pressure plate 72. The friction pad 74 provides retaining action, the pressure being adjustable as required. Since no positive lock is involved, emergency use of the rudder pedals is not impaired, slight additional foot pressure being sufficient to overcome the frictional connection until the trim setting handle 76 can be released.

While two interconnected rudders are illustrated, it should be noted that either rudder by itself will provide control, although to a lesser degree. In high speed forward flight, the forward rudder loses its effectiveness since the slipstream is deflected rearwardly, the rear rudder then providing the control action. In hovering or vertical flight, however, and especially in ground manoeuvring, the combined rudder action is very positive and rapid. The nose wheel 20 is, of course, fully castering for steering purposes and may be self-centering if desired.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:
1. The combination in an aircraft of a fuselage structure and a sustaining rotor mounted to provide a substantially downward slipstream around the fuselage structure; and directional control means, comprising at least one rudder continually exposed to the slipstream and pivotally mounted on said fuselage on an axis substantially radial to the axis of said rotor; actuating means operatively connected to said rudder for pivotal deflection thereof;

and trim setting means frictionally engageable with said actuating means to retain said rudder in a selected position against aerodynamic loads, while allowing over-riding of the frictional engagement by said actuating means.

2. The combination in an aircraft of a fuselage structure; a sustaining rotor mounted to provide a substantially downward slipstream around the fuselage structure; a directional control means comprising a forward rudder mounted on the forward portion of said fuselage structure, a rear rudder mounted on the rear portion of said fuselage structure, said rudders being continually exposed to the slipstream and being pivotally mounted on axes substantially radial to the axis of said rotor;

actuating means operatively connected to said rudders to offset the rudders in opposite directions about their respective axes, and trim setting means frictionally engageable with said actuating means to retain said rudders in selected positions against aerodynamic loads, while allowing over-riding of the frictional engagement by said actuating means.

References Cited in the file of this patent
UNITED STATES PATENTS

| | | |
|---|---|---|
| 1,774,558 | Laddon et al. | Sept. 2, 1930 |
| 2,437,324 | Kirchoff | Mar. 9, 1948 |
| 2,466,821 | Owen | Apr. 12, 1949 |
| 2,506,222 | Kesses | May 2, 1950 |
| 2,806,662 | Yonkers | Sept. 17, 1957 |